US006251486B1

(12) United States Patent
Chandross et al.

(10) Patent No.: US 6,251,486 B1
(45) Date of Patent: Jun. 26, 2001

(54) METHOD FOR COATING AN ARTICLE WITH A LADDER SILOXANE POLYMER AND COATED ARTICLE

(75) Inventors: Edwin Arthur Chandross, Murray Hill; Valerie Jeanne Kuck, Upper Montclair, both of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/352,674

(22) Filed: Jul. 11, 1999

Related U.S. Application Data

(63) Continuation-in-part of application No. 08/926,210, filed on Sep. 9, 1997, now Pat. No. 5,962,067.

(51) Int. Cl.[7] ................................................... B05D 5/12
(52) U.S. Cl. ...................... 427/387; 502/162; 502/167; 502/172; 528/20; 528/21; 528/23; 528/43; 556/458; 428/304.4
(58) Field of Search .................... 427/387; 502/162, 502/167, 172; 528/20, 21, 23, 43; 556/458; 428/304.4

(56) References Cited

U.S. PATENT DOCUMENTS

| | | | |
|---|---|---|---|
| 3,450,672 | 6/1969 | Merrill et al. | 528/12 |
| 4,264,649 | 4/1981 | Claypoole et al. | 427/163 |
| 4,835,057 | 5/1989 | Bagley et al. | 428/391 |
| 4,981,530 | 1/1991 | Clodgo et al. | 148/33.3 |
| 5,052,779 | 10/1991 | Honjo et al. | 385/145 |
| 5,198,518 | 3/1993 | Yamamoto et al. | 528/12 |
| 5,224,265 | 7/1993 | Dux et al. | 29/852 |
| 5,232,548 | 8/1993 | Ehrenberg et al. | 156/630 |
| 5,286,572 | 2/1994 | Clodgo et al. | 428/447 |
| 5,679,608 | 10/1997 | Cheung et al. | 437/195 |
| 5,693,566 | 12/1997 | Cheung | 437/195 |
| 5,726,211 | 3/1998 | Hedrick et al. | 521/61 |
| 5,773,197 | 6/1998 | Carter et al. | 430/313 |
| 5,804,607 | 9/1998 | Hedrick et al. | 521/64 |
| 5,854,131 | 12/1998 | Dawson et al. | 438/666 |
| 5,858,871 | 1/1999 | Jeng | 438/623 |
| 5,859,162 | 1/1999 | Yamamoto et al. | 528/31 |
| 5,883,219 | 3/1999 | Carter et al. | 528/310 |
| 5,895,263 | 4/1999 | Carter et al. | 438/624 |
| 5,962,067 | * 10/1999 | Bautista et al. | |

FOREIGN PATENT DOCUMENTS

| | | |
|---|---|---|
| 0725103A2 | 8/1996 | (EP) . |
| 63-056569A | 3/1988 | (JP) . |
| 05125187 | 5/1993 | (JP) . |
| 06200030 | 10/1994 | (JP) . |

OTHER PUBLICATIONS

J. Remenar et al., "Dendri–Glass–Design of Ultra–low Dielectric Constant Materials Using Specialty Highly Branched Polymers," *Polymer Preprints,* vol. 39, No. 1 (1998).

R. Miller et al. "Porous Organosilicates as Low–k Insulators for Dielectric Applications," Abstract No. 01.2 (1999).

S. Araki et al., "A New Heat Resistant Optical Fiber with Special Coating", International Wire and Cable Proceedings, pp. 745–750 (1988).

\* cited by examiner

*Primary Examiner*—Robert Dawson
*Assistant Examiner*—Kuo-Liang Peng
(74) *Attorney, Agent, or Firm*—Scott Rittman

(57) ABSTRACT

An improved siloxane-based composition for use as a low κ dielectric material in integrated circuit applications is provided, the composition exhibiting desirable thermal mechanical stability compared to conventional siloxane-based low-κ compositions. Specifically, the invention provides a modified methylsilsesquioxane composition suitable for higher temperature applications than a composition formed from only methylsilsesquioxane. The modified oligomer is characterized by the pendant group ratio A:B:C, where A represents the percentage of pendant groups that are methyl and is about 13 to about 67, B represents the percentage of pendant groups that are dimethyl and is greater than 0 to about 33, and C represents the percentage of pendant groups that are phenyl and is greater than 0 to about 67. The presence of dimethyl and phenyl pendant groups provides a molecular structure that has improved crack-resistance compared to an all-methyl silsesquioxane. Advantageously, the modified methylsilsesquioxane oligomer is fabricated by a particular technique, involving mixing methyltriethoxysilane monomer, before hydrolysis and condensation, with dimethyldiethoxysilane monomer that has already been partially hydrolyzed and condensed. This technique further improves the thermal mechanical stability of the resultant cured material. For low κ integrated circuit application, a pore generator material is advantageously used to provide a porous final structure.

18 Claims, No Drawings

METHOD FOR COATING AN ARTICLE WITH A LADDER SILOXANE POLYMER AND COATED ARTICLE

CROSS-REFERENCE TO RELATED APPLICATIONS

This application is a continuation-in-part of U.S. patent application Ser. No. 08/926,210, filed on Sep. 9, 1997, now U.S. Pat. No. 5,962,067, the disclosure of which is hereby incorporated by reference.

BACKGROUND OF THE INVENTION

1. Field of the Invention

The invention relates to low dielectric constant materials, in particular materials comprising siloxanes.

2. Discussion of the Related Art

As integrated circuit device integration densities rise and circuit dimensions shrink, certain problems are encountered. For example, the smaller line dimensions increase the resistivity of the metal lines, and the narrower interline spacing increases the capacitance between the lines. This increased resistance and capacitance causes problems in propagation delay, crosstalk noise, and power dissipation. Moreover, as the device speed increases due to smaller feature sizes, the resistance-capacitance (RC) delay caused by the increased resistivity and capacitance will tend to be the major fraction of the total delay (transistor delay+interconnect delay) limiting the overall chip performance. It is therefore desirable to reduce the increased resistance and capacitance in integrated circuit applications.

To address these problems, new materials for use as metal lines and interlayer dielectrics (ILD), as well as alternative architectures, have been proposed to replace the current $SiO_2$-based interconnect technology. These alternative architectures will require the introduction of low dielectric constant ($\kappa$<3) materials as the interlayer dielectric and/or low resistivity conductors such as copper.

It is desired that new low $\kappa$ materials exhibit a variety of electrical, chemical, mechanical and thermal properties. These properties include low dielectric constant, high thermal stability, good adhesion, low stress, good mechanical properties, etchability and etch selectivity, low moisture absorption, high thermal conductivity, low leakage current, high breakdown strength, and easy and inexpensive manufacturability.

A variety of low $\kappa$ materials have been proposed to meet some or all of these criteria. The materials are typically produced by chemical vapor deposition (CVD) or by spin-on coating. Materials produced by CVD include fluorinated $SiO_2$ glass ($\kappa$=3.5), fluorinated amorphous carbon, and polymers such as the parylene and polynaphthalene families, and polytetrafluoroethylene (PTFE) (K=2.7–3.5 for nonfluorinated polymers and 1.8–3.0 for fluorinated polymers). Materials deposited by spin-on coating include organic polymers, morganic polymers, inorganic-organic hybrids, and porous materials such as xerogels or aerogels. Organic materials typically offer lower dielectric constants than inorganic materials but, in some cases, can exhibit undesirably low thermal stability and poor mechanical properties.

One approach to polymeric low $\kappa$ materials has been the use of porous organic polymers. See, e.g., U.S. Pat. Nos. 5,895,263, 5,773,197, and 5,883,219, the disclosures of which are hereby incorporated by reference. See also J. Remenar et al., "Dendri-Glass-Design of Ultra-low Dielectric Constant Materials Using Specialty Highly Branched Polymers," *Polymer Preprints*, Vol. 39, No. 1 (March 1998); and R. Miller et al., "Porous Organosilicates as Low-$\kappa$ Insulators for Dielectric Applications," Abstract No. 01.2, MRS Spring 99 Meeting. These articles relate to methyl- or methy/phenyl-silsesquioxane resins with organic macromolecular pore generators, referred to as porogens. These porogens are capable of being decomposed after the resin is cured to leave nanoscopic pores. But a careful heating regime is generally required to prevent pore collapse as well as cracking. Also, methylsilsesquioxane-based materials tend to be brittle, and thus prone to cracking due to thermal-mechanical shock. (This problem was orally presented by R. Miller at the MRS Spring 1999 Meeting.) The cracking problem is particularly acute when the materials are deposited in several layers, which is typically the case.

Thus, organic low $\kappa$ materials are desired, where the materials exhibit a variety of desirable properties, particularly good crack resistance at the elevated temperatures experienced during fabrication of an IC device.

SUMMARY OF THE INVENTION

The invention provides an improved siloxane-based composition for use as a low$\kappa$ dielectric material in integrated circuit applications. The composition exhibits desirable thermal mechanical stability compared to conventional siloxane-based low$\kappa$ compositions. (Thermal mechanical stability indicates the temperature at which a material maintains its mechanical integrity after exposure for an extended time, e.g., greater than one month.)

In one embodiment, a modified methylsilsesquioxane composition is provided. This composition is more suitable for high temperature applications than a composition formed from only methylsilsesquioxane (referred to herein as all-methyl). (The term modified methylsilsesquioxane indicates the presence of dimethyl and/or phenyl pendant groups on a methylsilsesquioxane structure). According to this embodiment, onto a substrate is disposed a composition containing a modified methylsilsesquioxane oligomer, a pore generator material, a solvent suitable for depositing the composition onto a substrate, e.g., by spin-deposition, and, optionally, a catalyst. Suitable catalysts include moderately strong protic acids (stronger than a non-perfluorinated carboxylic acid, but weaker than a sulfonic acid), as well as moderately strong bases ($pK_a$ of at least 9).

The modified oligomer is characterized by the pendant group ratio A:B:C, where A represents the percentage of pendant groups that are methyl and is typically about 13 to about 67, B represents the percentage of pendant groups that are dimethyl and is typically greater than 0 to about 33, and C represents the percentage of pendant groups that are phenyl and is typically greater than 0 to about 67. (A+B+C=100.) (A pendant group is a carbon-based moiety that is attached to a silicon atom in the siloxane backbone, e.g., methyl, dimethyl, phenyl.) Curing rates depend heavily upon the particular pendant group ratio of the modified methylsilsesquioxane and on the particular composition. The presence of dimethyl and phenyl pendant groups provides a molecular structure that has better crack-resistance than all-methyl silsesquioxane, and this embodiment thus exhibits a thermal mechanical stability superior to an all-methyl material.

Advantageously, the modified methylsilsesquioxane oligomer is fabricated by a particular technique of the invention, such that a layer exhibiting even higher thermal mechanical stability is formed. This fabrication technique for the modified methylsilsesquioxane involves mixing methyltriethoxysilane monomer, before hydrolysis and condensation, with dimethyldiethoxysilane monomer that has already been partially hydrolyzed and condensed. Optionally, phenyltriethoxysilane monomer is added to the partially hydrolyzed dimethyldiethoxysilane, and it is possible for the phenyltriethoxysilane to be partially hydrolyzed.

This fabrication technique reduces the possibility of forming large blocks of methylsiloxy groups in the condensation polymer. Such reduction is desirable because extensive cross-inking of methylsiloxy groups leads to a stiff molecular structure with relatively poor thermal mechanical stability, evidenced by a tendency of the material to develop cracks. In the molecular structure formed from this novel fabrication technique, the cross-linking of methylsiloxy groups is reduced, and the dimethylsiloxy groups act as plasticizer segments between the cross-links. Phenyl pendant groups increase shock resistance, thermal stability, and also contribute to the overall flexibility of the structure by reducing the cross-link network density. This flexible molecular structure is able to withstand relatively high temperatures. For example, a composition containing a 20:60:20 oligomer formed by this technique was able to withstand about a month at temperatures over 200° C. without cracking.

DETAILED DESCRIPTION OF THE INVENTION

According to the invention, a siloxanebased composition is deposited onto a substrate as a low-κ dielectric layer, during integrated circuit manufacture. The compositions, detailed below, are deposited by conventional techniques, such as spinning, which are easily incorporated into back end of the line (BEOL) manufacturing steps.

One embodiment of the invention involves application onto a substrate of a composition that contains a modified methylsilsesquioxane oligomer containing pendant dimethyl and pendant phenyl groups. In particular, the composition contains a mixture of the modified methylsilsesquioxane oligomer, a pore generator material, a solvent which promotes deposition of the composition onto a substrate, and, optionally, a catalyst of a moderately strong protic acid or moderately strong base, as defined above. Inclusion of phenyl pendant groups tends to enhance oxidative stability and reduce cross-link network density, and inclusion of dimethyl pendant groups also tends to increase flexibility by reducing cross-link network density and further reduce thermal shock sensitivity.

An example of a structure of a 33:33:33 ladder silsesquioxane is shown below (Φ represents a phenyl group). Other pendant group distributions are also possible.

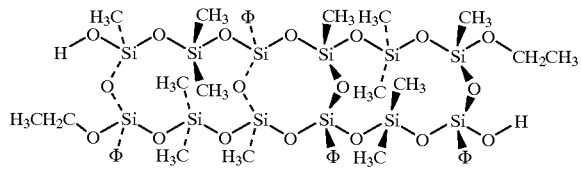

The structure contains a randomly-spaced distribution of cross-links separated by dimethylsiloxy groups, with phenyl groups offering further reduced network density without introducing excessive softness. The presence of phenyl and/or dimethyl pendant groups tends to slow the cure rate (i.e., the rate of condensation) of the coating (as reflected in the examples below), and therefore affects the need for a catalyst.

This embodiment uses an oligomer that is characterized by an A:B:C pendant group ratio, where A represents the percentage of pendant groups that are single methyl and is typically about 13 to about 67, B represents the percentage of pendant groups that are dimethyl and is typically greater than 0 to about 67, and C represents the percentage of pendant groups that are phenyl and is typically greater than 0 to about 67. (A+B+C=100 (or 99, for an equal distribution of pendant groups).) The desired ratio is obtained by inclusion of the appropriate amounts of methyltriethoxysilane monomer, dimethyldiethoxysilane monomer, and phenyltriethoxysilane monomer. The oligomer is typically a liquid having a viscosity of about 10,000 to about 30,000 cp. It is possible to prepare the oligomers by mixing the desired amounts of methyltriethoxysilane, dimethyldiethoxysilane, and phenyltriethoxysilane with the necessary amount of water, and driving the condensation. It is also possible to use substituted phenyls.

The pore generator material is generally at least one decomposable polymer that is dispersed within the oligomer. Typically, the pore generator material is thermally decomposable, such that decomposition occurs at some temperature above the condensation temperature of the oligomer. Suitable materials include a variety of linear polymers, cross-linked polymeric nanospheres, block copolymers, and hyperbranched polymers. The pore generator material should also be compatible with the oligomer and the catalyst system, e.g., substantially inert, such that there is no premature decomposition of the pore generator material, and such that the curing of the oligomer is substantially unaffected. Selection of appropriate material is within the skill of an ordinary artisan. (For a more detailed discussion of pore generator materials, see Col. 2, line 49 to Col. 3, line 60 of U.S. Pat. No. 5,895,263, cited above.) Once condensation of the oligomer is performed, the cured material is then heated up to the decomposition temperature, at which the pore generating material decomposes to volatile fragments capable of diffusing out of the cured siloxane structure. Due to the structure integrity of the siloxane structure, the resulting pores will typically occupy nearly the same volume occupied by the now-decomposed polymer. Thus, it is possible to adjust pore size by selection of the polymer material.

A variety of solvents are suitable for promoting deposition of the composition onto a substrate. The type and concentration will vary depending on the characteristics of the oligomer and pore generator material, as well as the deposition technique, e.g., spin deposition. Selection of an appropriate type and concentration of solvent is easily performed by use of control samples. Any solvent remaining after deposition will generally exit the material during resin cure.

The catalyst, when present, is typically added in an amount ranging from about 0.5 to about 6 weight percent based on the weight of the siloxane oligomer. Advantageously, the moderately strong protic acid is PPA (phenylphosphonic acid). A useful base catalyst is triethanolamine. Preferably, metal salt catalysts are avoided. The catalyst is useful in obtaining an acceptable cure rate when phenyl pendant groups are present and represents an acceptable balance between shelf life and cure rate.

To decrease the probability of localized oligomer condensation during addition of a catalyst, it is useful to dilute the oligomer and/or the catalyst with a solvent before mixing the oligomer and catalyst.

The composition is deposited onto a substrate by any suitable method, e.g., spinning. Curing is performed by conventional techniques, e.g., heating to a temperature sufficient to promote curing (but less than the decomposition temperature of the pore generator material). The curing temperature typically ranges from about 100 to about 220° C. The particular cure conditions, as apparent to one skilled in the art, will depend on resin composition, catalyst concentration, time, and temperature. As mentioned above, once the oligomer is cured to form the siloxane structure, the material is heated to the decomposition temperature of the pore generator material to decompose the material, thereby providing the porous structure that exhibits the desired dielectric properties.

As mentioned above, the known, commercial method of forming a silsesquioxane oligomer containing methyl, dimethyl, and phenyl pendant groups is to mix methyltriethoxysilane, dimethyldiethoxysilane, and phenyltriethoxysilane monomers, and the required amount of water, and then heat the reactants to drive the condensation. Advantageously, however, the modified methylsilsesquioxanes are fabricated by a particular technique of the invention, such that the resultant composition, with certain ratios of pendant groups, is capable of withstanding temperatures of over 200° C. for prolonged (>1 month) exposure.

In particular, it was not previously known that the commercial method of fabrication favors the partial hydrolysis of the most reactive monomer, methyltriethoxysilane, followed by condensation of the hydrolyzed species with itself and/or methyltriethoxysilane. The known method thus results in blocks of material with extensive cross-linking between methylsiloxy groups, after curing, creating a relatively stiff molecular structure that exhibits poor thermal mechanical stability. However, according to the invention, it was discovered that when the dimethyldiethoxysilane is partially hydrolyzed before addition of methyltriethoxysilane monomer, coupling of a methylsiloxy group with the silanol group of a dimethylsiloxy group is preferred over coupling with another methylsiloxy group. In the resultant structure, therefore, the cross-linking of methylsiloxy groups is reduced, and the dimethylsiloxane groups act as plasticizer segments between the cross-links. Phenyl pendant groups, when present, contribute to the overall flexibility of the structure by reducing the cross-link network density without introducing excessive softness.

According to the novel fabrication technique of the invention, therefore, the silsesquioxane oligomer is fabricated by mixing methyltriethoxysilane monomer with dimethyldiethoxysilane monomer that has already been partially hydrolyzed (referred to hereafter as a stepwise addition). It is possible to purchase pre-formed dimethylsiloxane short chains instead of performing a pre-hydrolysis of dimethyldiethoxysilane (short chains indicate linear polydimethylsiloxane chains having relatively low molecular weight, e.g., 360–450). If desired, phenyltriethoxysilane monomer is also mixed with the partially hydrolyzed dimethyldiethoxysilane monomer or the dimethylsiloxane short chains, and it is possible for this phenyltriethoxysilane monomer to be partially hydrolyzed as well.

It was further realized that the formation or inclusion of low molecular weight dimethylsiloxane chains in this technique, while useful in reducing the overall cross-link density, reduced the number of silanol groups available for reaction with the added triethoxysilane monomer. Thus, upon simultaneous addition of methyltriethoxysilane monomer and water to partially hydrolyzed dimethyldiethoxysilane (or dimethylsiloxy short chains), the probability of forming oligomer segments rich in methylsiloxy groups in fact increased. Such segments would constitute highly cross-linked, stiff regions prone to cracking. It was found that inclusion of a higher number of dimethyl groups reduced the potential for formation of such highly cross-linked regions. Specifically, a percentage of dimethyl groups (i.e., a B value) of about 50 to about 60 was found to be advantageous in providing desirable thermal stability. An oligomer having a B value higher than about 60 is typically difficult to make.

Advantageously, the silsesquioxane oligomer made by this unique fabrication technique, as described in terms of pendant group ratio A:B:C (methyl:dimethyl:phenyl), has an A value of about 13 to about 67, a B value of greater than 0 to about 60, and a C value of 0 to about 33. Most advantageously for good mechanical properties, A is about 10 to about 30, B is about 40 to about 60, and C is about 10 to about 30. However, the curing process proceeds most readily in the absence of phenyl groups.

It is possible to provide the oligomer fabricated by this unique technique with a useful viscosity by selection of the fabrication conditions, e.g., the amount of water that is used in the partial condensation of the monomers, the temperature the condensation is taken to, and the temperature of the oligomer solution. It is useful in some cases to add a catalyst, as discussed above, to promote the condensation reaction. The catalyst is advantageously phenylphosphonic acid (which is useful in obtaining a desirable cure rate for phenyl-containing oligomers), and, when present, is typically added in an amount ranging from about 1 to about 6 weight percent based on the weight of the siloxane oligomer.

Once the oligomer is prepared in the above manner, the composition is prepared as discussed above. The composition is then applied to a substrate, the oligomer is cured, and the pore generator material is decomposed, as discussed above.

Using a composition containing an oligomer prepared by this novel technique, it is possible to form a siloxane, using a pendant group ratio of the oligomer of about 20:60:20, that is able to withstand temperatures above 200° C. for about a month without cracking.

Incorporation of the siloxane-based material into an integrated circuit structure is performed in accordance with standard techniques for IC manufacture.

Other embodiments of the invention will be apparent to those skilled in the art from consideration of the specification and practice of the invention disclosed herein.

What is claimed is:

1. A method for fabricating an article comprising an integrated circuit device, comprising the steps of:
    disposing a composition on a substrate, wherein the composition comprises a silsesquioxane oligomer having methyl, dimethyl, and phenyl pendant groups, a pore generator material, and a solvent; and
    curing the composition.

2. The method of claim 1, wherein the composition further comprises a catalyst of a moderately strong protic acid or a moderately strong base.

3. The method of claim 1, wherein the silsesquioxane oligomer has a pendant group ratio of A:B:C, where A represents methyl pendant groups and ranges from about 13 to about 67, B represents dimethyl pendant groups and ranges from greater than 0 to about 33, and C represents phenyl pendant groups and ranges from greater than 0 to about 67.

4. The method of claim 2, wherein the catalyst is phenylphosphonic acid or triethanolamine.

5. The method of claim 2, wherein the catalyst is present in an amount ranging from about 0.5 to about 6 weight percent, based on the weight of the oligomer.

6. A method for fabricating an article comprising an integrated circuit device, comprising the steps of:

disposing a composition on a substrate, wherein the composition comprises a pore generator material, and a silsesquioxane oligomer fabricated by a process comprising the step of mixing methyltriethoxysilane monomer, and optionally phenyltriethoxysilane monomer, with partially hydrolyzed dimethyldiethoxysilane monomer or dimethylsiloxane short chains; and curing the composition.

7. The method of claim 6, wherein the phenyltriethoxysilane monomer is partially hydrolyzed.

8. The method of claim 6, wherein the silsesquioxane oligomer has a pendant group ratio of A:B:C, where A represents methyl pendant groups and ranges from about 13 to about 67, B represents dimethyl pendant groups and ranges from greater than 0 to about 60, and C represents phenyl pendant groups and ranges from 0 to about 33.

9. The method of claim 8, wherein A is about 10 to about 30, B is about 40 to about 60, and C is about 10 to about 30.

10. The method of claim 6, wherein the composition further comprises a catalyst of a moderately strong protic acid or a moderately strong base.

11. The method of claim 10, wherein the catalyst is phenylphosphonic acid or triethanolamine.

12. The method of claim 10, wherein the catalyst is present in an amount of about 1 to about 6 weight percent based on the weight of the oligomer.

13. The method of claim 9, wherein the cured composition has a thermal mechanical stability of at least 200° C.

14. An article comprising an integrated circuit device that comprises a cured composition disposed on a substrate, wherein the composition comprises a cured silsesquioxane oligomer, the oligomer fabricated by a process comprising the steps of mixing methyltriethoxysilane monomer, and optionally phenyltriethoxysilane monomer, with partially hydrolyzed dimethyldiethoxysilane monomer or dimethylsiloxy short chains, and wherein the cured composition exhibits a porous structure.

15. The article of claim 14, wherein the phenyltriethoxysilane monomer is partially hydrolyzed.

16. The article of claim 14, wherein the silsesquioxane oligomer has a pendant group ratio of A:B:C, where A represents methyl pendant groups and ranges from about 13 to about 67, B represents dimethyl pendant groups and ranges from greater than 0 to about 60, and C represents phenyl pendant groups and ranges from 0 to about 33.

17. The article of claim 16, wherein A ranges from about 10 to about 30, B ranges from about 40 to about 60, and C ranges from about 10 to about 30.

18. The article of claim 17, wherein the composition has a thermal mechanical stability of at least 200° C.

* * * * *